United States Patent
Newman

(10) Patent No.: US 10,283,878 B2
(45) Date of Patent: May 7, 2019

(54) NEUTRAL CONDUCTOR CONNECTION PROTECTION DEVICES AND COVER ASSEMBLY KITS, ELECTRICAL CONNECTIONS AND METHODS INCLUDING SAME

(71) Applicant: TE Connectivity Corporation, Berwyn, PA (US)

(72) Inventor: John Anthony Newman, Garner, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 15/703,575

(22) Filed: Sep. 13, 2017

(65) Prior Publication Data

US 2019/0081415 A1    Mar. 14, 2019

(51) Int. Cl.
| | | |
|---|---|---|
| *H01R 4/00* | (2006.01) | |
| *H01R 4/22* | (2006.01) | |
| *H01B 3/28* | (2006.01) | |
| *H02G 1/00* | (2006.01) | |
| *H02G 1/14* | (2006.01) | |
| *H01B 17/58* | (2006.01) | |

(52) U.S. Cl.
CPC ............. *H01R 4/22* (2013.01); *H01B 3/28* (2013.01); *H01B 17/58* (2013.01); *H02G 1/005* (2013.01); *H02G 1/14* (2013.01)

(58) Field of Classification Search
CPC . H01R 4/22; H01B 3/28; H01B 17/58; H02G 1/005; H02G 1/14
USPC ... 174/102 R, 102 SC, 110 R, 110 SR, 74 R, 174/78, 84 R, 88 R
See application file for complete search history.

(56) References Cited

U.S. PATENT DOCUMENTS

| | | |
|---|---|---|
| 3,163,707 A | 12/1964 | Darling |
| 3,475,719 A | 10/1969 | Akin et al. |
| 3,689,114 A | 9/1972 | Meserole |
| 4,601,529 A | 7/1986 | Billet |
| 4,968,857 A | 11/1990 | McGrane |
| 5,233,363 A | 8/1993 | Yarsunas et al. |
| 5,286,220 A | 2/1994 | Watson |
| 5,315,063 A | 5/1994 | Auclair |
| 5,577,926 A | 11/1996 | Cox |
| 5,740,583 A | 4/1998 | Shimada et al. |

(Continued)

FOREIGN PATENT DOCUMENTS

WO    2009/137013    11/2009

OTHER PUBLICATIONS

"CSJA In-line Cold Shrinkable Joints for 1/C Shielded Power Cables (15-35kV)" Tyco Electronics (2 pages) (2006/2007).

(Continued)

*Primary Examiner* — William H. Mayo, III
(74) *Attorney, Agent, or Firm* — Myers Bigel, P.A.

(57) ABSTRACT

A cover system for covering an electrical connection between first and second electrical cables each having a primary conductor and a neutral conductor, includes a neutral connector and a neutral connector cover. The neutral connector is configured to mechanically and electrically connect the neutral conductors of the first and second electrical cables. The neutral connector cover has a cavity. The neutral connection cover is configured to receive the neutral connector in the cavity to protect the neutral connector.

22 Claims, 7 Drawing Sheets

(56) References Cited

U.S. PATENT DOCUMENTS

| | | | |
|---|---|---|---|
| 5,844,170 A | 12/1998 | Chor et al. | |
| 6,364,677 B1 | 4/2002 | Nysveen et al. | |
| 7,182,617 B1 | 2/2007 | Cairns et al. | |
| 7,264,494 B2 | 9/2007 | Kennedy et al. | |
| 7,476,114 B1* | 1/2009 | Contreras | H01R 4/70 |
| | | | 439/201 |
| 7,728,227 B2 | 6/2010 | Portas et al. | |
| 7,858,883 B2 | 12/2010 | Seraj et al. | |
| 8,030,570 B2 | 10/2011 | Seraj et al. | |
| 8,205,911 B2 | 6/2012 | Cordes et al. | |
| 9,184,576 B2 | 11/2015 | Vallauri et al. | |
| 9,202,612 B2 | 12/2015 | Hernandez et al. | |
| 9,224,519 B2 | 12/2015 | McLaughlin et al. | |
| 9,224,522 B2 | 12/2015 | Yaworski et al. | |
| 9,960,576 B2 | 5/2018 | Chuang | |
| 2005/0269124 A1 | 12/2005 | Suzuki et al. | |
| 2007/0293087 A1 | 12/2007 | Kennedy et al. | |
| 2008/0143097 A1 | 6/2008 | Canale | |
| 2009/0181583 A1 | 7/2009 | Krabs | |
| 2010/0012350 A1 | 1/2010 | Hardi et al. | |
| 2010/0193235 A1* | 8/2010 | Taylor | H02G 15/103 |
| | | | 174/363 |
| 2010/0276196 A1* | 11/2010 | Seraj | H01R 9/0512 |
| | | | 174/84 R |
| 2010/0279542 A1* | 11/2010 | Seraj | H01R 4/72 |
| | | | 439/502 |
| 2011/0011484 A1* | 1/2011 | Evoniuk | H02G 15/1833 |
| | | | 138/177 |
| 2013/0183464 A1* | 7/2013 | Gassaway | B32B 1/08 |
| | | | 428/34.9 |
| 2014/0273579 A1* | 9/2014 | Madden | H01R 13/5205 |
| | | | 439/275 |
| 2014/0370741 A1* | 12/2014 | Bolcato | G01R 15/142 |
| | | | 439/471 |
| 2016/0005511 A1* | 1/2016 | Gravermann | H02G 15/04 |
| | | | 174/251 |
| 2017/0250008 A1* | 8/2017 | Somasiri | H01B 3/306 |
| 2017/0310093 A1 | 10/2017 | Chuang | |
| 2017/0317481 A1* | 11/2017 | O'Sullivan | H02G 3/0462 |
| 2018/0145495 A1* | 5/2018 | Iyer | H01B 3/441 |

OTHER PUBLICATIONS

"CSJA Cold Shrinkable 'All-In-One' Straight Joint for Polymeric Insulated Cables Up to 42 kV" Tyco Electronics EPP 1348 (4 pages) (Jul. 2007).

International Search Report and the Written Opinion of the International Searching Authority in corresponding PCT Application No. PCT/US2018/048259 (10 pages) (dated Nov. 7, 2018).

* cited by examiner

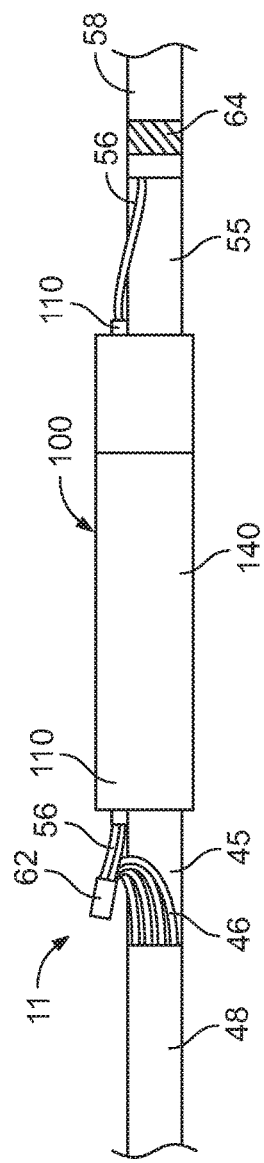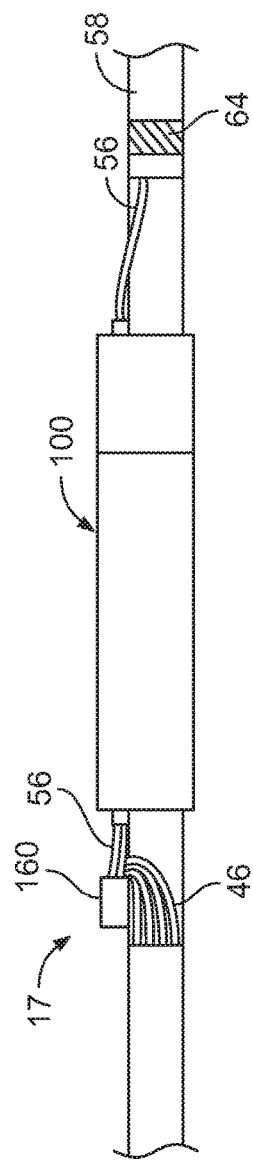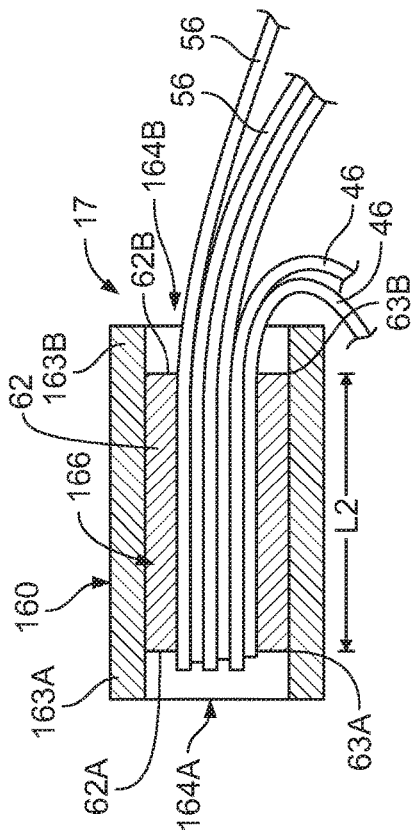

NEUTRAL CONDUCTOR CONNECTION PROTECTION DEVICES AND COVER ASSEMBLY KITS, ELECTRICAL CONNECTIONS AND METHODS INCLUDING SAME

FIELD OF THE INVENTION

The present invention relates to electrical cables and connections and, more particularly, to protective covers for electrical cables and electrical connections.

BACKGROUND OF THE INVENTION

Covers, such as cold shrinkable covers, are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from TE Connectivity, which includes an integral neutral conductor mesh. It is also known to cover splices between concentric neutral cables using a cold shrink elastomeric cover tube (such as the CSJ product, a plastic closure for sealing and protecting electrical cable, available from TE Connectivity) in combination with a separate re-jacketing cover (such as the GelWrap™ cover product, available from TE Connectivity). In this case, the cold shrink tube is installed over the primary conductors and the insulation layers, the neutral conductors are laid over the cold shrink tube, and the re jacketing cover is subsequently wrapped around the neutral conductors and the insulation layer. It is also known to provide a pass through duct that spans the cover tube and through which the neutral conductors are routed. In each case, the neutral conductors of the spliced cables may be electrically coupled using a neutral connector on one of both sides of the splice connector.

SUMMARY OF THE INVENTION

According to embodiments of the invention, a cover system for covering an electrical connection between first and second electrical cables each having a primary conductor and a neutral conductor, includes a neutral connector and a neutral connector cover. The neutral connector is configured to mechanically and electrically connect the neutral conductors of the first and second electrical cables. The neutral connector cover has a cavity. The neutral connection cover is configured to receive the neutral connector in the cavity to protect the neutral connector.

According to method embodiments of the invention, a method is provided for covering an electrical connection between first and second electrical cables each having a primary conductor and a neutral conductor. The method includes: mechanically and electrically connecting the neutral conductors of the first and second electrical cables using a neutral connector; providing a neutral connector cover having a cavity; and mounting the neutral conductor cover on the neutral connector such that the neutral connector is received in the cavity to protect the neutral connector.

BRIEF DESCRIPTION OF THE DRAWINGS

FIGS. 5-7 and 9-12 are side views illustrating methods according to embodiments of the invention for installing a cover system according to embodiments of the invention, the cover system including the neutral connector cover of FIG. 1 and the pre-expanded cover assembly unit of FIG. 1.

FIG. 8 is an enlarged, cross-sectional view of the neutral connector cover of FIG. 1 mounted on a neutral connector.

DETAILED DESCRIPTION OF THE DRAWINGS

Figure 1:
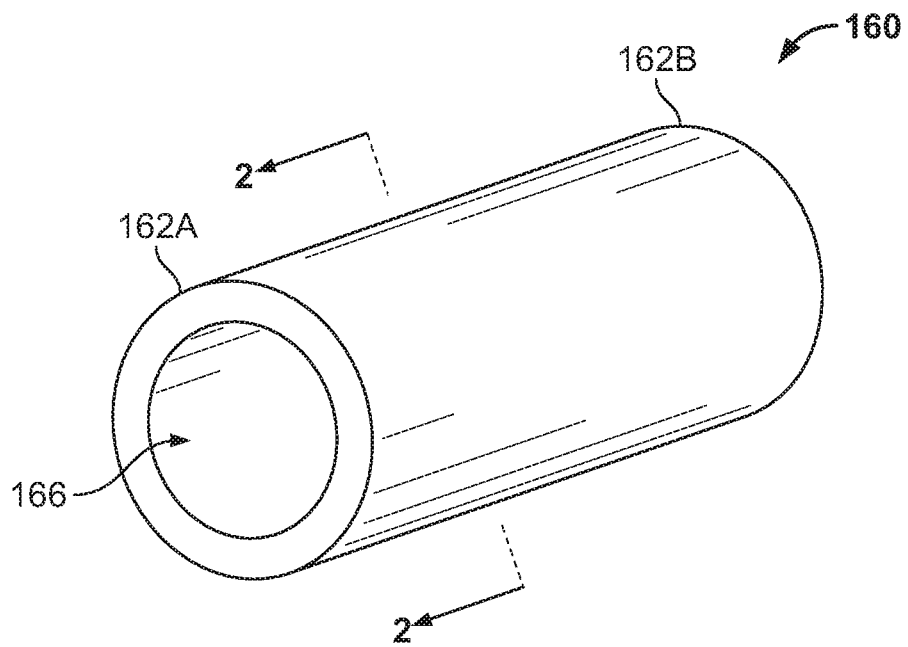
FIG. 1 is a perspective view of a neutral connector cover according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS. 1-13, a cover system 103 (FIG. 12) according to embodiments of the present invention is shown therein. The cover system 103 includes a cover assembly 100, a neutral wire or conductor connector 62 (hereinafter, "neutral connector"), and a neutral connector cover 160 according to embodiments of the present invention. The cover assembly 100 and the neutral connector cover 160 may be provided and packaged together as a cover system kit 105. The cover system 103 and kit 105 may further include a cable conductor connector 60, tape 66, and sealant 64.

The system 103 and kit 105 may be used to cover and electrically insulate electrical substrates such as cables and connectors. In particular, the system 103 and kit 105 can be used to cover and electrically insulate a splice connection 15 between a first concentric neutral cable 40 and second concentric neutral cable 50, and thereby form a protected connection 19 (FIG. 12) including the system 103, portions of the cables 40, 50, and the splice connector 60. The neutral connector 62 is used to mechanically couple and electrically connect the neutral conductors of the first cable 40 to the neutral conductors of the second cable. In accordance with the invention, the neutral connector cover 160 is in turn used to cover the neutral connector 62. As discussed herein, the neutral connector cover 160 then serves to protect one or more surrounding layers of the first or second cable or the cover system 103 from the neutral connector 62.

Figure 3:
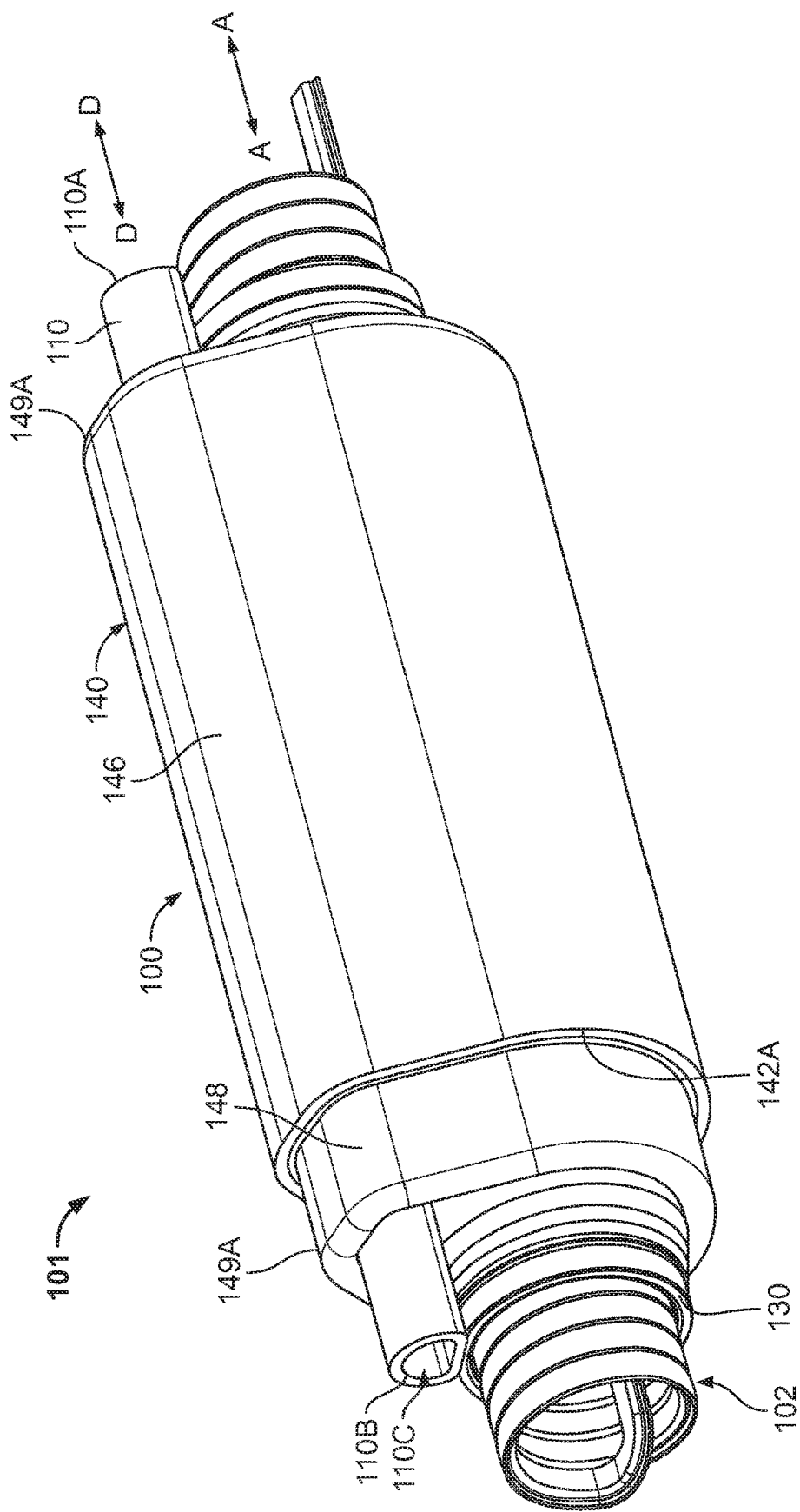
FIG. 3 is a perspective view of a pre-expanded cover assembly unit for use with the neutral connector cover of FIG. 1 according to some embodiments.
Figure 5:
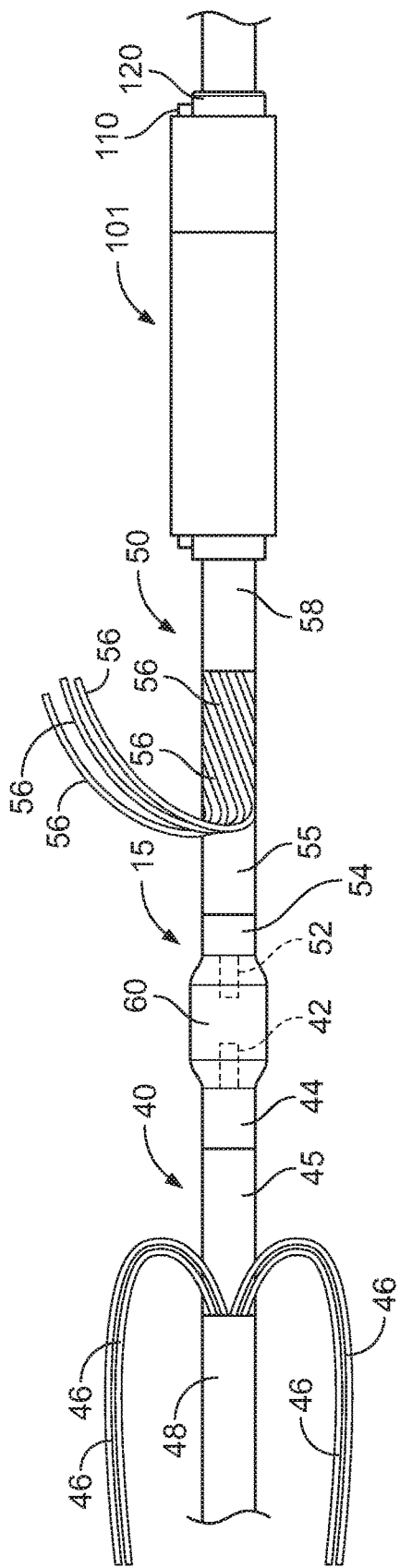
Figure 6:
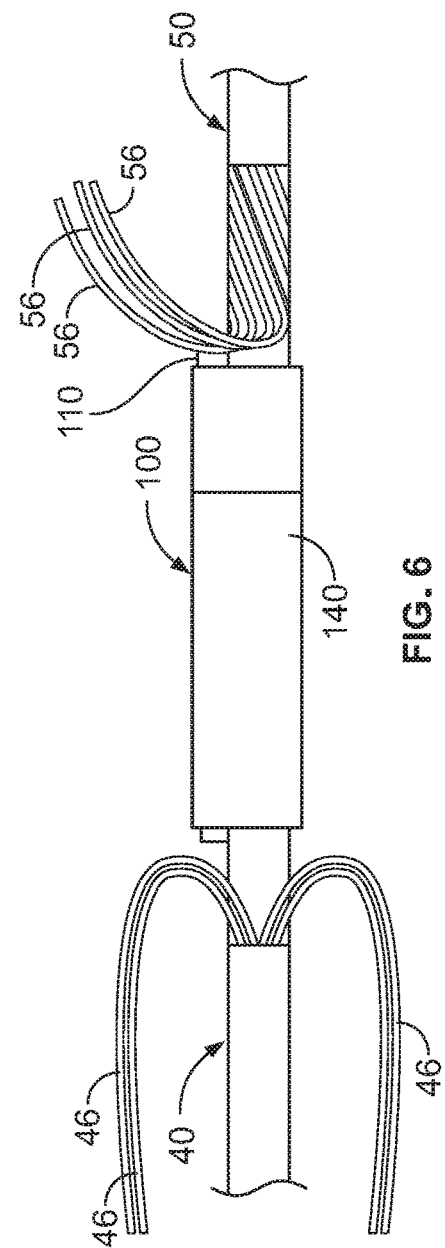
Figure 12:
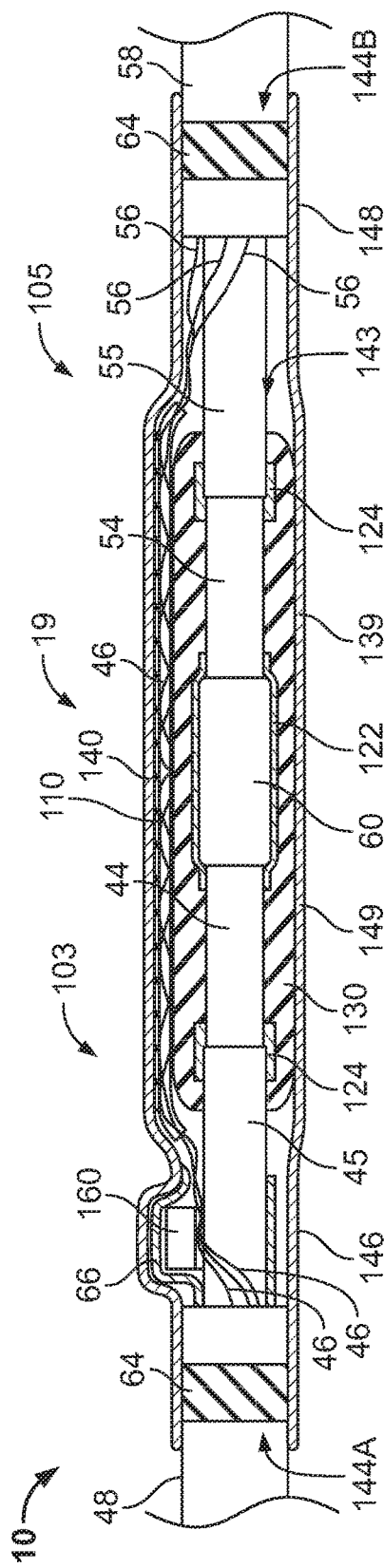

The cover assembly 100 may be provided as a pre-expanded cover assembly unit 101 including a holdout device 102, as shown in FIGS. 3 and 5, wherein the cover assembly 100 is in an expanded state or position. The cover assembly 100 may be deployed and mounted on the intended substrate in a retracted state or position as shown in FIGS. 6 and 12 and discussed in more detail below. According to some embodiments, the cover assembly 100 is a cold shrink cover, meaning that it can be shrunk or retracted about the substrate without requiring the use of applied heat.

The cover assembly 100 (FIGS. 3 and 12) includes a Faraday cage layer 122, two stress cone layers 124, an inner sleeve (or insulation body) 130, a semiconductor layer 139, an outer sleeve (or re-jacket) 140, and a passthrough tube or duct 110, as discussed in more detail below. In some embodiments, the Faraday cage layer 122, the stress cone layers 124, and the inner sleeve 130 are bonded (e.g., adhered or molded) together to form a unitary component.

Figure 11:
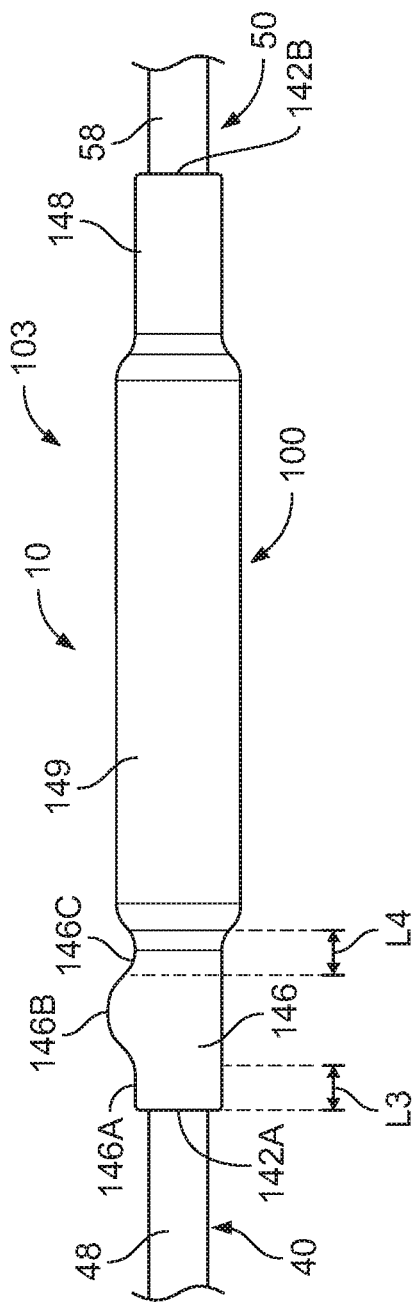

The cover assembly 100 may be used to cover and seal the connection or splice 15 between the cables 40, 50 and connector 60 to form a protected connection assembly 10 as shown in FIGS. 11 and 12.

Referring to FIGS. 3 and 12, the cover assembly 100 has a lengthwise axis A-A. The Faraday cage layer 122, the stress cone layers 124, the inner sleeve 130, the semiconductor layer 139, the outer sleeve 140, and the duct 110 are provided as an integral, unitary structure extending lengthwise along the axis A-A. According to some embodiments, the cover assembly 100 is provided pre-installed and pre-expanded on the holdout 102.

The inner sleeve 130 is tubular and defines an axially extending conductor through passage that communicates with opposed end openings.

The Faraday cage layer 122 is a generally tubular sleeve bonded to the inner surface of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are generally tubular sleeves bonded to the inner surface of the inner sleeve 130 at either end thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

The duct 110 is a tube or tubular sleeve or body and has a lengthwise axis D-D extending substantially parallel to the cover assembly axis A-A.

The inner surface of the duct 110 defines an axially extending neutral conductor through passage 110C terminating at and communicating with opposed and openings 110A, 110B.

The outer sleeve 140 has opposed ends 142A, 142B (FIG. 11). The outer sleeve 140 is tubular and defines an axially extending conductor through passage 143 that communicates with opposed end openings 144A, 144B (FIG. 12). When mounted on the holdout 102 as shown in FIGS. 3 and 5, outer sections 146 and 148 of the outer sleeve 140 are folded back on an intermediate section 149 of the outer sleeve 140 at annular folds 149A.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness of the outer sleeve 140 is in the range of from about 0.03 to 0.25 inch. According to some embodiments, the length of the outer sleeve 140 (when the sections 146, 148 are extended) is in the range of from about 15 to 35 inches. According to some embodiments, the length of each outer section 146, 148 of the outer sleeve 140 is in the range of from about 10 to 90 percent of its full length.

The tape 66 may be vinyl, adhesive-backed tape, for example.

The sealant 64 may be mastic, for example.

The neutral connector 62 (FIGS. 7 and 9) may be a crimp connector, for example. The connector 62 as shown is tubular and has openings at opposed ends 62A and 62B. The neutral connector 62 may be formed of a metal such as aluminum or copper.

The neutral connector cover 160 (FIGS. 1, 2 and 9) has or is a tubular or annular body. The neutral connector cover 160 has opposed ends 162A, 162B. The neutral connector cover 160 is tubular and defines an axially extending conductor cavity or through passage 166 that communicates with opposed end openings 164A, 164B.

In other embodiments, the cavity 166 may be closed on one end. The cavity or passage 166 may have any suitable cross-sectional shape, such as circular, oval or rectangular. The cross-section of the cavity or passage 166 may be uniform from end-to-end or non-uniform (e.g., tapered).

The neutral connector cover 160 can be formed of any suitable material. According to some embodiments, the neutral connector cover 160 is formed of an electrically insulative material. According to some embodiments, the neutral connector cover 160 is formed of an elastically expandable material. According to some embodiments, the neutral connector cover 160 is formed of an elastomeric material. According to some embodiments, the neutral connector cover 160 is formed of rubber. According to some embodiments, the neutral connector cover 160 is formed of ethylene propylene diene monomer (EPDM) rubber. Other suitable materials may include neoprene or other rubber.

According to some embodiments, the neutral connector cover 160 is flexible or semi-rigid. In some embodiments, the neutral connector cover 160 has a Modulus at 100 percent elongation (M100) in the range of from about 0.6 to 1.1 MPa.

According to some embodiments, the neutral connector cover 160 is a cold shrink cover, meaning that it can be radially expanded and radially shrunk or retracted about the substrate without requiring the use of applied heat.

In some embodiments, the neutral connector cover 160 may be formed of a rigid material.

In some embodiments, the material of the cover 160 is resistant to splits and punctures and has a high operating temperature range.

According to some embodiments, the neutral connector cover 160 has a nominal thickness T1 (FIG. 2) in the range of from about 0.03 to 0.3 inch.

According to some embodiments, the neutral connector cover 160 has an inner diameter or width W1 (FIG. 2) in the range of from about 0.5 to 1.25 inches.

According to some embodiments, the length L1 (FIG. 2) of the neutral connector cover 160 is in the range of from about 0.25 to 1 inch greater than the length L2 of the neutral connector 62.

Neutral connector covers, systems, kits and methods of the present invention can address problems associated with known methods and systems for covering a splice connection between concentric neutral cables. When making a medium voltage cable splice for underground cable, it is preferable to connect the jacketed concentric neutral wires across the splice. In a typical installation, the neutral wires are connected outside of the splice. This connection is made by collecting the neutral wires, bending them perpendicular to the cable axis, installing a connector, and then bending the neutral wire bundle back down towards the cable. Vinyl tape is sometimes applied around the neutral connection. The splice is then buried directly in the ground. When the copper neutral wires are exposed in this fashion, they are susceptible to corrosion from ground water or other sources.

In known methods, a complete re jacketing environmental sleeve is installed around the neutral connection, protecting it from the elements. This re jacketing component may be formed of EPDM, for example. After the neutral connection is made, the re-jacketing sleeve is unrolled from the center outward in both directions along the cables. The re-jacketing sleeve must pass over the neutral connector in this step. When the splice is buried back over in an underground installation, it is possible for rocks or other foreign matter in the backfill to drop right on top of the neutral connection. This will cause the re jacketing sleeve to be pinched between the sharp edges of the neutral connector on the inside and a heavy rock or other body on the outside. The high pressure exerted on the re jacketing sleeve can cause a local puncture under a range of environmental temperatures. This puncture will compromise the sealing integrity of the re jacketing sleeve. Since the re jacketing sleeve is under tension in the installed state, the local puncture can propagate into a longitudinal split and worsen the problem. The present invention solves this problem by adding an additional layer of protective material (e.g., EPDM) between the neutral connector and re-jacketing sleeve.

Figure 4:
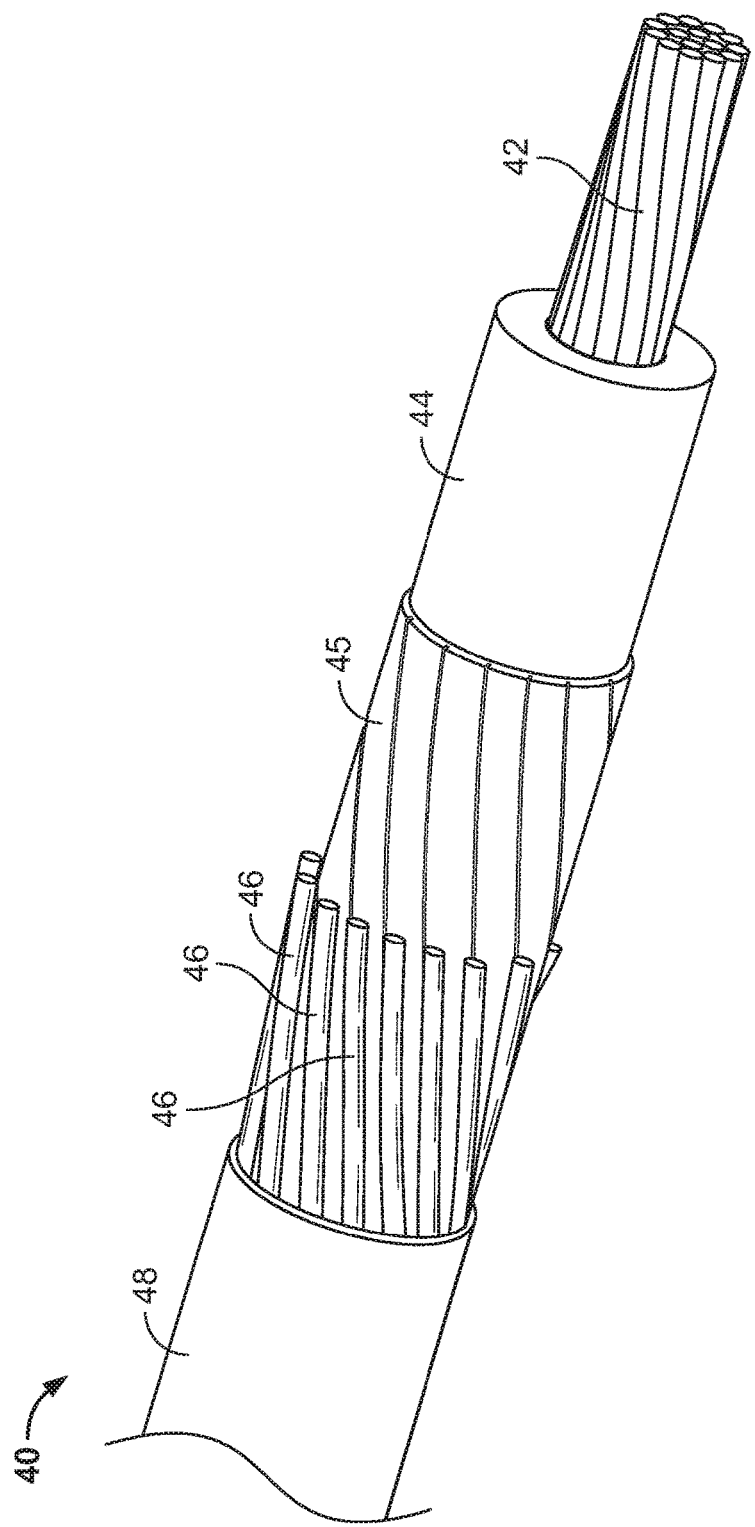
FIG. 4 is a perspective view of an exemplary concentric neutral cable.

Referring now to FIGS. 4-13, the neutral connector cover 160 and the kit 105 may be used in the following manner to apply the cover 100 over a splice connection 15 (FIG. 5) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 4, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 5 such that a segment of each layer extends beyond the next overlying layer, except that the neutral conductors 56 of the cable 50 extend at least a prescribed distance beyond the end of the primary conductor 52. This excess length of the conductors 56 can be folded back away from the terminal end of the primary conductor 52 as shown in FIG. 5.

The pre-expanded unit 101 is slid over the cable 50 as shown in FIG. 5. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage of the inner sleeve 130. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG.

5. The connector 60 may be any suitable type of connector such as a metal crimp connector.

The pre-expanded unit 101 is then slid into position over the connector 60 as shown in FIG. 6. The holdout 102 is then removed from the cover assembly 100, thereby permitting the elastomeric sleeves 130, 140 to relax and radially retract about the cables 40, 50 and the connector 60 as shown in FIG. 6. According to some embodiments, the inner sleeve 130 overlaps and engages the semiconductor layers 44, 54 of the cables 40, 50.

The excess length of the neutral conductors 56 is routed or threaded through the passage 110C of the duct 110. Alternatively, the neutral conductors 56 can be routed through the duct 110 before the holdout 102 has been removed and the cover assembly 100 has been initially secured about the splice connection 15.

The neutral conductors 46 are then electrically and mechanically coupled to the neutral conductors 56 by the neutral connector 62 to form a neutral conductor connection 11 as shown in FIG. 7. The neutral connector 62 may be any suitable connector such as a metal crimp connector. As shown in FIG. 7, the neutral conductors 46, 56 of the two cables 40, 50 may be coupled to one another on only one side of the connector 60. Alternatively, the neutral conductors 46, 56 may be coupled to one another on both sides of the connector 60.

The excess lengths of the neutral conductors 46, 56 extending beyond the end 62A of the neutral connector 62 may then be cut down to a length close to or substantially flush with the end 62A of the neutral connector 62 as shown in FIG. 9.

The neutral connector cover 160 is then pushed onto and over the neutral connector 62 to form a protected neutral connector assembly 17 as shown in FIGS. 8 and 9. The neutral connector cover 160 is slid onto the neutral connector 62 such that the cover 160 surrounds the connector 62 along its full length and end sections 163A and 163B of the cover 160 extend beyond the opposed axial ends 62A and 62B of the connector 62. In this way, the end sections 163A, 163B overhang the connector 62 and cover the end edges 63A, 63B of the connector 62. The cover 160 is elastic, which permits the cover to stretch and/or flex to receive and engage the connector 62.

The cover 160 maintains a secure fit to retain the cover 160 on the connector 62. In some embodiments, the relaxed inner diameter of the neutral connector cover 160 is substantially the same as the outer diameter of the neutral connector 62. In this case, the cover 160 fits snugly onto the connector 62 and provides a frictional fit that resists displacement from the connector 62.

In some embodiments, the relaxed inner diameter of the neutral connector cover 160 is less than the outer diameter of the neutral connector 62. In this case, the neutral connector cover 160 exerts a persistent, radially inwardly compressive or clamping force or pressure (due to elastic tension) onto the neutral connector 62.

Before or after installing the cover 160, the protected neutral connector assembly 17 is pushed down toward the cable 40 as shown in FIG. 8. Typically, the neutral conductors 46, 56 are bendable but stiff so that they will substantially retain the position into which they are bent.

Figure 10:
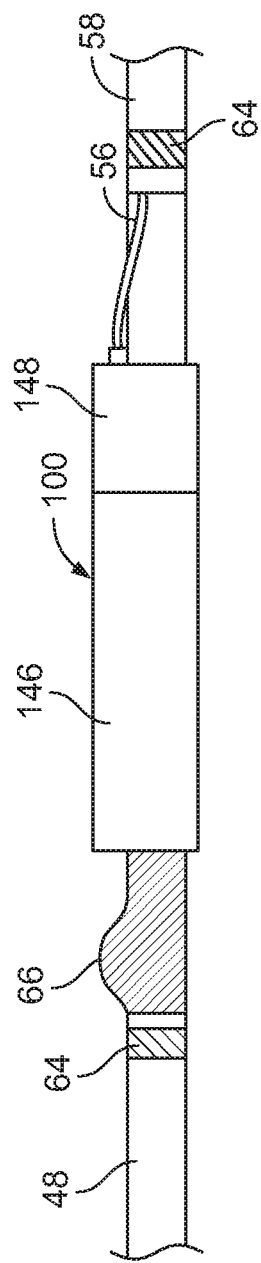

The tape 66 is then wrapped around the cable 40, the neutral conductors 46, and the protected neutral connector assembly 17 as shown in FIG. 10. The tape 66 may be helically wound. In some embodiments, the tape 66 is wrapped axially from a location on or proximate the inner sleeve 130 to a location on a side of the protected neutral connector assembly 17 distal from or opposite the splice connection 15 as shown in FIG. 10 so that the assembly 17 is completely covered by the tape 66.

Strips of sealant 64 are applied to the outer surfaces of the cable jackets 48, 58.

The operator then rolls each of the extension sections 146, 148 of the outer sleeve 140 axially outwardly to cover the adjacent sections of the cables 40 and 50, respectively. According to some embodiments, at least a portion of each extension section 146, 148 overlaps a respective portion of each cable jacket 48, 58 and engages the associated sealant strip 64 to provide a moisture seal. The cover assembly 100 is thereby fully installed to form the connection assembly 10 as shown in FIGS. 11 and 12.

When installed (FIGS. 11 and 12), the extension section 146 covers and surrounds the protected neutral connector assembly 17 and the tape 66. The extension section includes a section 146A extending between the inner sleeve 130 and the assembly 17, a section 146B extending over the assembly 17, and a section 146C extending axially beyond the assembly 17 in a direction opposite the splice connection 15. According to some embodiments, the section 146A has a length L3 of at least about 3 inches. According to some embodiments, the section 146C has a length L4 of at least about 2 inches.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the outer sleeve 140 is at least 25% less than the smallest diameter cable upon which the cover assembly 100 is intended to be installed.

In some embodiments, the cover 160 closely, snugly, or intimately surrounds the connector 62 so that the cover 160 contacts the connector 62 on substantially the full circumference of the connector 62. The cover 160 is radially interposed between the connector 62 and the cable 40.

The neutral connector cover 160, system 103, kit 105, and method solve or address the problems discussed above with regard to the prior art by adding an additional layer of material (e.g., EPDM), in the form of the neutral connection cover 160, between the neutral connector 62 and the re-jacketing sleeve 140. The neutral connector cover 160 covers up any sharp edges from the neutral connector 62 or tips of the neutral wires 46, 56 that could present themselves to the inside surface of the re jacketing sleeve 140. The neutral connector cover 160 reduces the pressure created by impact of an external object (e.g., back fill) by distributing or dissipating the impact force over a greater surface area.

The neutral connector cover 160 has an additional benefit of protecting the cable jacket 48 and the semiconductive layer 45 of the cable 40 from similar sharp edges of the neutral connector 62 or wires 46, 56. This is especially important when the installer is bending the neutral connector 62 back down toward the cable 40.

The neutral connector cover 160 also makes it easier to unroll the re jacketing sleeve 140 by smoothing over the outer surface of the neutral connector 62 that the re-jacketing sleeve 140 must to pass over.

In some embodiments, the neutral connector cover 160 is configured or adapted to accommodate a range of connector types and sizes in the application range. These types of neutral connectors may include barrel connectors, C-crimp connectors, compression connectors, mechanical connectors, shear bolt connectors, and others. The neutral connector cover 160 may be compatible with in-line butt and bypass neutral connections, as well as 90 degree connections.

Figure 13:
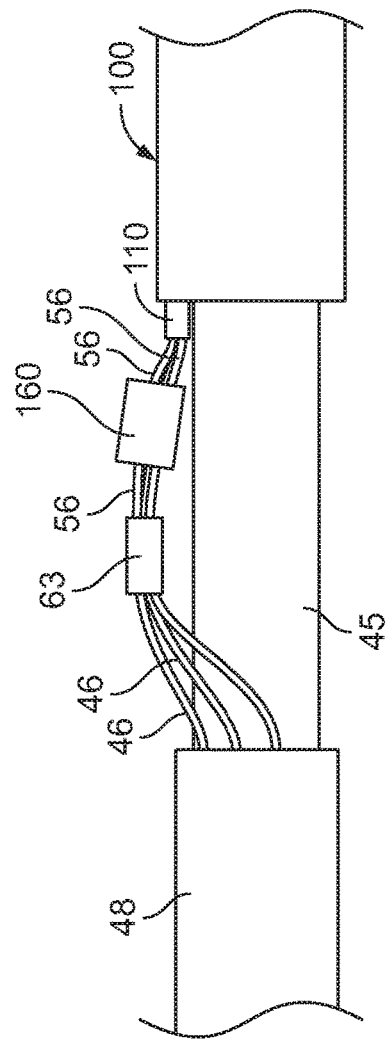
FIG. 13 is a side view of the neutral connector cover of FIG. 1 in the process of being mounted on an in-line neutral connector.

The neutral connector cover 160 can also be used to cover an in-line neutral connector. With reference to FIG. 13, the neutral connector cover 160 is parked on the neutral conductors 56. The neutral conductors 46 and 56 are then connected by an inline neutral connector 63. The excess lengths of the neutral conductors 46, 56 may be trimmed. The neutral connector cover 160 is then slid or pushed onto the inline neutral connector 63. The remainder of the installation may be conducted as described above.

In other embodiments, a heat shrinkable elastomer tubular sleeve or heat shrinkable wraparound sleeve may be installed as a re-jacket around the splice connection and the protected neutral connector assembly 17 in place of the cold shrink outer sleeve 140.

In other embodiments, the protected neutral connector assembly 17 may be used without a re-jacket.

Figure 2:
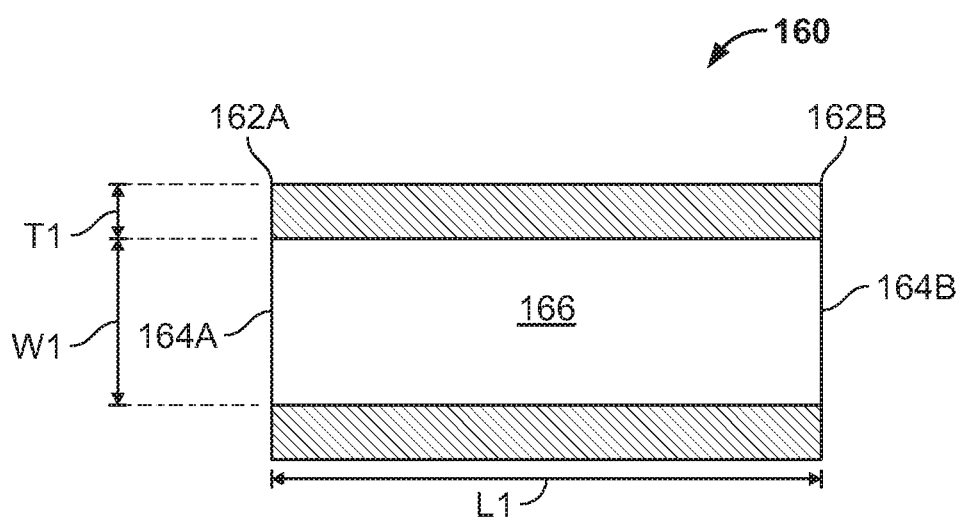
FIG. 2 is a cross-sectional view of the neutral connector cover of FIG. 1 taken along the line 2-2 of FIG. 1.

The geometric shape and dimensions of the neutral connector cover 160 as illustrated in FIGS. 1 and 2 are exemplary and the shape and dimensions suitable for implementation of the present invention are not limited to the illustrated shape and dimensions.

While in the embodiments shown in the drawings the neutral conductors are wires, according to further embodiments the neutral conductors may take other shapes or configurations such as one or more flat tapes. In some embodiments, an elongate jumper or extension conductor is provided that is clamped or otherwise secured in electrical contact with the cable neutral conductors (e.g., flat copper tapes) on either side of the splice and is routed through the duct (e.g., the duct 110) as described herein. In this case, the jumper conductor constitutes a neutral conductor and is an extension of the neutral conductor of at least one of the spliced cables. The jumper conductor may be a braided copper mesh or sock, for example. Embodiments of this type may be constructed and used as described in U.S. Pat. No. 8,030,570, the disclosure of which is hereby incorporated herein.

In some embodiments, the cover assembly 100 includes two or more ducts 110. The neutral wires are routed through two or more of the ducts 110 and connected by respective neutral connectors 62. A respective neutral connector cover 160 is then mounted on each of the neutral connectors 62 as described herein.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Neutral connector covers, cover assembly kits, and cover assemblies according to embodiments of the invention may be used for any suitable cables and connections. Such neutral connector covers, cover assembly kits, and cover assemblies may be adapted for use, for example, with connections of medium voltage cables up to about 46 kV.

In some applications, the neutral connector covers, cover assembly kits, and cover assemblies are installed on underground residential distribution (URD) cable splices and are buried underground. In some embodiments, neutral connector cover and cover assembly are buried with gravel or other fill material in direct contact with and loading the outer sleeve 140.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A protected connection comprising:
   an electrical connection between first and second electrical cables, the first and second electrical cables each having a primary conductor and a neutral conductor;
   a neutral connector mechanically and electrically connecting the neutral conductors of the first and second electrical cables;
   a neutral connector cover having a cavity and mounted on the neutral connector, wherein the neutral connector is received in the cavity of the neutral connector cover;
   a layer of tape wrapped around the neutral connector cover, the neutral connector, and at least one of the first and second electrical cables; and
   an elastomeric outer sleeve surrounding the electrical connection, the neutral connector, the neutral connector cover, and the layer of tape.

2. The protected connection of claim 1 wherein the neutral connector cover is formed of an elastomeric material.

3. The protected connection of claim 2 wherein the neutral connector cover is formed of ethylene propylene diene monomer (EPDM) rubber.

4. The protected connection of claim 2 wherein the neutral connector cover has a Modulus at 100 percent elongation (M100) in the range of from about 0.6 to 1.1 MPa.

5. The protected connection of claim 1 wherein the neutral connector cover has a nominal thickness in the range of from about 0.03 to 0.3 inch.

6. The protected connection of claim 1 wherein the neutral connector cover is tubular.

7. The protected connection of claim 6 wherein:
   the neutral connector has axially opposed ends;
   the neutral connector cover has an axial cover length;
   the neutral connector has an axial connector length; and
   the axial cover length is greater than the axial connector length so that the neutral connector cover extends axially beyond each of the opposed ends of the neutral connector.

8. The protected connection of claim 7 wherein the length of the neutral connector cover is in the range of from about 0.25 to 1 inch greater than the length of the neutral connector.

9. The protected connection of claim 1 including:
   an elastomeric inner sleeve surrounded by the outer sleeve, the inner sleeve defining a cable passage to receive the primary conductors of the first and second electrical cables; and
   a duct interposed radially between the inner and outer sleeves, the duct defining a duct passage;

wherein at least one of the neutral conductors extends through the duct passage.

10. The protected connection of claim 9 including:
a Faraday cage sleeve mounted within the inner sleeve and formed of an electrically conductive elastomer;
a stress cone sleeve mounted within the inner sleeve proximate an end thereof, wherein the stress cone sleeve is formed of an electrically conductive elastomer; and
a semiconductor layer mounted on an outer side of the inner sleeve.

11. A method for covering an electrical connection between first and second electrical cables each having a primary conductor and a neutral conductor, the method comprising:
mechanically and electrically connecting the neutral conductors of the first and second electrical cables using a neutral connector;
providing a neutral connector cover having a cavity;
mounting the neutral conductor cover on the neutral connector such that the neutral connector is received in the cavity;
wrapping a layer of tape around the neutral connector cover, the neutral connector, and at least one of the first and second electrical cables; and
mounting an elastomeric outer sleeve over the electrical connection such that the outer sleeve surrounds the electrical connection, the neutral connector, the neutral connector cover, and the layer of tape.

12. The method of claim 11 wherein the neutral connector cover is formed of an elastomeric material.

13. The method of claim 12 wherein the neutral connector cover is formed of ethylene propylene diene monomer (EPDM) rubber.

14. The method of claim 12 wherein the neutral connector cover has a Modulus at 100 percent elongation (M100) in the range of from about 0.6 to 1.1 MPa.

15. The method of claim 11 wherein the neutral connector cover has a nominal thickness in the range of from about 0.03 to 0.3 inch.

16. The method of claim 11 wherein the neutral connector cover is tubular.

17. The method of claim 16 wherein:
the neutral connector has axially opposed ends;
the neutral connector cover has an axial cover length;
the neutral connector has an axial connector length; and
the axial cover length is greater than the axial connector length so that the neutral connector cover extends axially beyond each of the opposed ends of the neutral connector when the neutral connector cover is mounted on the neutral connector.

18. The method of claim 17 wherein the length of the neutral connector cover is in the range of from about 0.25 to 1 inch greater than the length of the neutral connector.

19. The pre-expanded cover assembly unit of claim 18 wherein:
the cover assembly includes a Faraday cage sleeve mounted within the inner sleeve and formed of an electrically conductive elastomer;
the cover assembly includes a stress cone sleeve mounted within the inner sleeve proximate an end thereof, wherein the stress cone sleeve is formed of an electrically conductive elastomer; and
the cover assembly includes a semiconductor layer mounted on an outer side of the inner sleeve.

20. The method of claim 11 including:
mechanically and electrically connecting the primary conductors of the first and second electrical cables using a cable conductor connector;
providing an integral, unitary pre-expanded cover assembly unit including:
a cover assembly including:
an elastomeric inner sleeve defining a cable passage to receive the primary conductors of the first and second electrical cables;
the outer sleeve, wherein the outer sleeve surrounds the inner sleeve; and
a duct interposed radially between the inner and outer sleeves, the duct defining a duct passage configured to receive at least one of the neutral conductors therethrough; and
a removable holdout mounted within the inner sleeve, wherein the holdout is operative to temporarily maintain the inner sleeve in an expanded state and the outer sleeve in an expanded state;
mounting the cover assembly on the first and second electrical cables such that the cable conductor connector and the primary conductors of the first and second electrical cables extend through the cable passage;
inserting the neutral conductor of the first electrical cable through the duct passage; and
removing the holdout from inner sleeve.

21. The method of claim 11 including mounting an elastomeric inner sleeve and the outer sleeve over the electrical connection such that:
the inner sleeve surrounds the electrical connection and is surrounded by the outer sleeve;
the neutral connector cover and the neutral connector are not surrounded by the inner sleeve; and
the tape is surrounded by the outer sleeve.

22. A method for covering an electrical connection between first and second neutral conductors of an electrical cable, the method comprising:
mechanically and electrically connecting the first and second neutral conductors in-line using an in-line neutral connector;
providing a neutral connector cover having a cavity;
mounting the neutral conductor cover on the neutral connector such that the neutral connector is received in the cavity;
wrapping a layer of tape around the neutral connector cover, the neutral connector, and the electrical cable; and
mounting an elastomeric outer sleeve over the electrical connection such that the outer sleeve surrounds the electrical connection, the neutral connector, the neutral connector cover, and the layer of tape.

* * * * *